Patented Oct. 21, 1952

2,615,019

UNITED STATES PATENT OFFICE 2,615,019

PREPARATION OF GUANIDINE AND MELAMINE

William J. Klapproth, Jr., Stamford, Conn., assignor to American Cyanamid Company, New York, N. Y., a corporation of Maine No Drawing. Application October 25, 1950, Serial No. 192,159

10 Claims. (Cl. 260—249.7)

The present invention relates to the simultaneous preparation of guanidine values and melamine.

It is an object of the invention to heat hydrogen cyanide, ammonia, and phosphoric acid in the presence of a catalyst to form a reaction mass comprising guanidine values and melamine. Additional objects will be apparent from the discussion hereinafter.

The invention contemplates heating hydrogen cyanide, ammonia, and phosphoric acid in the presence of an inert catalyst of high surface area such as kieselguhr, celite, kaolin, fuller's earth, pumice, alumina, and the like, in a closed reaction zone at a temperature within the range of about 275°–450° C. and under a pressure of at least 500 p. s. i. The time of reaction can vary from about 15 minutes up. The proportions of reactants can also vary, virtually without limit. Mole ratios of $HCN:NH_3:H_2PO_4$ within the range 1–20:1–20:1–20 are preferred however.

By the term "guanidine values" is meant guanidine in combined form. As actually produced in this invention the guanidine is apparently in the form of a phosphate, but as it is rather soluble in this form, it is preferably recovered in the form of a less soluble salt, such as the nitrate or picrate.

The following examples illustrate without limiting the invention.

Example 1

50 g. of catalyst consisting of 65% $H_3PO_4$ on kieselguhr was placed in a 310-cc. autoclave. 22 g. of HCN and 42 g. of $NH_3$ were then charged to the autoclave, which was then sealed and heated at 350° C. under the autogenously developed pressure of 4000 p. s. i. for 7½ hours. At the end of this time the autoclave was cooled, vented, and the solids removed and slurried in 115 cc. of hot water. The slurry was heated nearly to boiling preferably in the presence of decolorizing charcoal to precipitate HCN-polymer, and filtered, reduced in volume of evaporation, and cooled to precipitate melamine. Guanidine values were recovered by addition of picrate ions to precipitate guanidine as the picrate. Various other methods, well known in the art, of separating guanidine values from melamine can also be used. The yield of guanidine calculated to free guanidine was 1.7 g. The melamine yield was somewhat smaller.

Example 2

In a preferred embodiment of the invention, carbon dioxide is added to the reactants of Example 1 to increase the yields of both guanidine values and melamine. Thus, under conditions analogous to those of Example 1, using 21 g. HCN, 30 g. $NH_3$, 25 g. of ammonium carbamate, and 50 g. of the same catalyst, heating at 350° C. under the autogenously developed pressure of 3600 p. s. i. for 6 hours, guanidine was recovered as the picrate amounting to 5.1 g. calculated as free guanidine. There was simultaneously formed 0.5 g. of melamine along with the guanidine values.

In Example 2, the ammonium carbamate dissociated under the reaction conditions to provide $NH_3$ and $CO_2$. Obviously the $CO_2$ can be added to the reaction zone as such, if desired. The amount of $CO_2$ added is not critical, and the $HCN:CO_2$ mole ratio can vary between limits of 1–20:1–20 or even wider.

It is preferred that the phosphoric acid be dispersed throughout the catalyst, but this is not absolutely necessary.

While the invention has been described with particular reference to specific embodiments, it is to be understood that it is not to be limited thereto but is to be construed broadly and restricted solely by the scope of the appended claims.

I claim:

1. The method that comprises heating hydrogen cyanide, ammonia, and phosphoric acid in the presence of a catalyst of the group consisting of fuller's earth, kieselguhr, celite, pumice, alumina, and kaolin at a temperature in the approximate range of 275–450° C. and under a pressure of at least 500 p. s. i. in a closed reaction zone to form a reaction mass comprising guanidine phosphate and melamine.

2. The method according to claim 1 in which the temperature is about 350° C.

3. The method according to claim 1 in which carbon dioxide is added to the reaction zone prior to the reaction.

4. The method according to claim 3 in which the temperature is about 350° C., the pressure is that autogenously produced, and the catalyst is kieselguhr.

5. The method that comprises heating hydrogen cyanide, ammonia, and phosphoric acid in the presence of a kieselguhr catalyst in a closed reaction zone at a temperature in the range of about 275°–450° C. and at a pressure of at least 500 p. s. i. to form a reaction mass comprising guanidine phosphate.

6. The method according to claim 5 in which carbon dioxide is added to the reaction zone before the reaction.

7. The method according to claim 6 in which the temperature is about 350° C.

8. The method of preparing melamine that comprises heating hydrogen cyanide, ammonia, and phosphoric acid in the presence of a kieselguhr catalyst in a closed reaction zone at a temperature in the range of about 275°–450° C. and at a pressure of at least 500 p. s. i. to form a reaction mass comprising melamine, and separating the thus-formed melamine.

9. The method according to claim 8 in which carbon dioxide is added to the reaction zone prior to the reaction.

10. The method according to claim 9 in which the temperature is about 350° C.

WILLIAM J. KLAPPROTH, Jr.

No references cited.